(12) United States Patent
Juliato

(10) Patent No.: US 10,503,253 B2
(45) Date of Patent: Dec. 10, 2019

(54) SENSOR SIGNAL PROCESSING TO DETERMINE FINGER AND/OR HAND POSITION

(71) Applicant: INTEL CORPORATION, Santa Clara, CA (US)

(72) Inventor: Marcio Juliato, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 15/087,385

(22) Filed: Mar. 31, 2016

(65) Prior Publication Data

US 2017/0285744 A1    Oct. 5, 2017

(51) Int. Cl.
   *G06F 3/01*        (2006.01)
(52) U.S. Cl.
   CPC .............. *G06F 3/014* (2013.01); *G06F 3/017* (2013.01)
(58) Field of Classification Search
   CPC .................................. G06F 3/014; G06F 3/017
   See application file for complete search history.

(56) References Cited

U.S. PATENT DOCUMENTS

| 2013/0190903 A1* | 7/2013 | Balakrishnan | ....... A61B 5/7246 700/91 |
| 2014/0002353 A1* | 1/2014 | Lim | .......................... G06F 3/03 345/156 |
| 2014/0160055 A1 | 6/2014 | Margolis et al. | |
| 2014/0240103 A1* | 8/2014 | Lake | ...................... G08C 17/02 340/12.5 |

FOREIGN PATENT DOCUMENTS

WO    2013-142516 A1    9/2013

OTHER PUBLICATIONS

International Search Report and Written Opinion for PCT Application No. PCT/US2017/019935, dated May 24, 2017, 12 pages.
International Preliminary Report on Patentability for PCT Application No. PCT/US2017/019935, dated Oct. 11, 2018, 9 pages.
Marcio Juliato, "System and Method to Collect Gesture Input Through Wrist Tendon and Muscle Sensing", PCT Application No. PCT/US2015/067534, filed Dec. 22, 2015, 52 pages.

* cited by examiner

Primary Examiner — Chun-Nan Lin
(74) Attorney, Agent, or Firm — Jordan IP Law, LLC

(57) ABSTRACT

Systems, apparatuses, and/or methods to determine finger and/or hand position. For example, sensors on a wrist of a user may provide sensor signals. A filter may generate filtered sensor signals from the sensor signals, wherein each filtered sensor signal may include a modified signal component. A sorter may sort each filtered sensor signal in a composite pattern based on each modified signal component. A classifier may determine finger and/or hand position based on the composite pattern. In one example, a function of a computing platform may be controlled based on the finger and/or hand position.

19 Claims, 7 Drawing Sheets

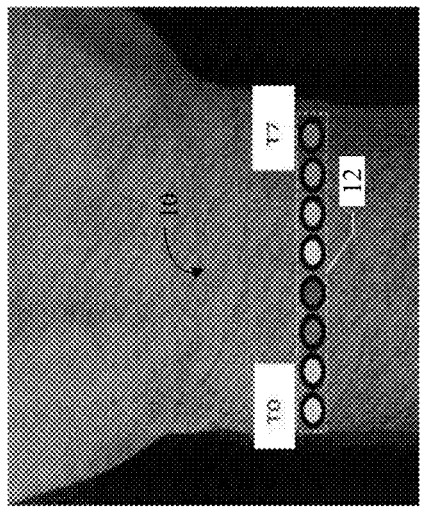
FIG. 1B
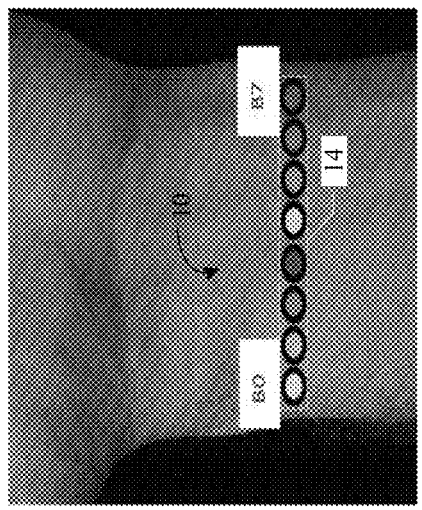
FIG. 1C
FIG. 1A
FIG. 1D

60a "Thumb up" position:
60b {[T1,T4,T3,T5,B7,B2,B3,T2,B1,T0,B5,B0,B6,T6,B4,T7],
60c  [T1,T4,T3,T5,B7,B3,B2,T2,T0,B1,B5,B0,B6,T6,B4,T7],
     [T1,T4,T3,T5,B7,B3,B2,T2,B1,T0,B5,B0,B6,T6,B4,T7]} 62a 60d "One" position (index extended):
60e {[T2,T4,T5,B3,B7,T3,B1,T0,T1,B4,T7,B0,B2,T6,B5,B6],
60f  [T2,T4,T5,B3,B7,T3,B1,T1,T0,B4,B0,T7,B2,T6,B5,B6],
     [T2,T4,T5,B3,B7,T3,B1,T1,T0,B0,B4,T7,B2,T6,B5,B6]} 62b 60g "Two" position (index and middle fingers extended):
60h {[T4,T5,B7,B3,T2,T3,B1,T1,T0,B2,T6,B5,B0,T7,B4,B6],
60i  [T4,T5,B7,B3,T3,B1,T2,T1,T0,B2,T6,B5,B0,T7,B4,B6],
     [T4,T5,B7,B3,T3,T2,B1,T1,T0,B2,T6,B5,B0,T7,B4,B6]} 62c 60j "Three" position (index, middle and ring fingers extended):
60k {[T4,T5,B1,B7,T3,B5,T2,B2,T0,B3,T1,B0,T6,T7,B6,B4],
60l  [T4,T5,B1,B7,T3,B5,T2,B2,B3,T0,T1,B0,T6,T7,B6,B4],
     [T4,T5,B1,B7,T3,B5,T2,B2,T0,B3,T1,T6,B0,T7,B6,B4]} 62d

FIG. 3B

SENSOR SIGNAL PROCESSING TO DETERMINE FINGER AND/OR HAND POSITION

TECHNICAL FIELD

Embodiments generally relate to determining finger and/or hand position. More particularly, embodiments relate to processing sensor signals to determine finger and/or hand position.

BACKGROUND

Conventional systems to determine finger and/or hand position may use a wristband that provides a user input system with a motion tracking sensor to track aerial motion of a wrist of a user as aerial motion data. Other conventional systems use a forearm band to measure electromyography, or EMG, of forearm muscles. EMG involves testing electrical stimulation of muscles. Still other conventional systems use a camera to track body movement. A separate band or device, however, is required to be attached to the body of the user or used with the system so the system can detect arm movement for input control. In addition, aerial motion data, EMG data, or image data may not account for relatively small movements (e.g., of a tendon or a muscle) during a same gesture over time, which in turn may lead to erroneous gesture identification or incorrect input control. Moreover, EMG data may require relatively complex signal processing to translate acquired electrical signals into a meaningful hand position. Thus, there is significant room for improvement to determine finger and/or hand position.

BRIEF DESCRIPTION OF THE DRAWINGS

The various advantages of the embodiments will become apparent to one skilled in the art by reading the following specification and appended claims, and by referencing the following drawings, in which:

FIGS. 1A-1D are illustrations of an example of sensors in a sensor array to generate sensor signals that may be combined into a composite data package according to an embodiment;

FIGS. 3A-3B are illustrations of example waveforms for unfiltered sensor signals corresponding to finger and/or hand positions, and waveforms for filtered sensor signals corresponding to the finger and/or hand positions that are combined into composite data packages and grouped into sets of composite data packages, according to an embodiment;

DESCRIPTION OF EMBODIMENTS

Figure 2:
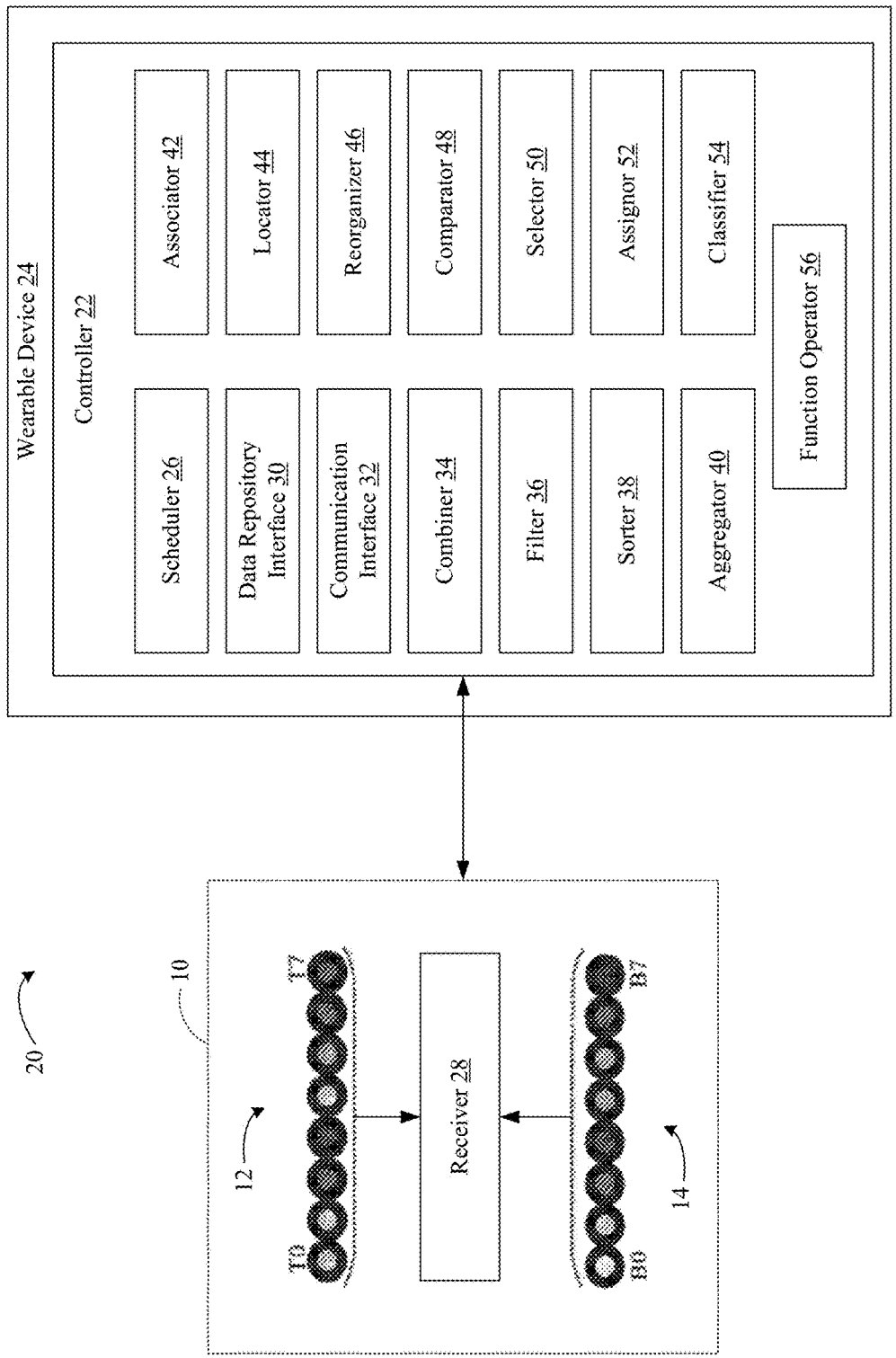
FIG. 2 is an illustration of an example of an apparatus to determine finger and/or hand position according to an embodiment.

Turning now to FIGS. 1A-1D, a sensor array 10 is shown to generate sensor signals according to an embodiment. The sensor array 10 includes sensors 12, 14 that generate sensor signals corresponding to static and/or dynamic positions of a tendon (e.g., flexor, extensor) and/or a muscle (e.g., muscle fiber) on a wrist of a user. For example, the sensors 12, 14 may sense movement, flex, contraction, extension, etc., of a tendon and/or a muscle on a wrist. In one example, the sensors 12, 14 include pressure sensors that may be readily incorporated onto an internal surface of a wearable device (e.g., a wristband, a smart watch, a wearable processor, etc.), to make contact with a wrist at particular locations and generate sensor signals corresponding to force and/or pressure of a tendon and/or a muscle at the particular locations.

The sensors 12, 14 may be fed with a predetermined voltage (e.g., 5V) of electrical power to generate sensor signals corresponding to a level of applied force and/or pressure. In one example, output from each sensor of the sensor array 10 may be electrically transferred (e.g., to a microcontroller) as an analog sensor signal through a pull down resistor (e.g., a 10 k ohms resistor). The analog sensor signal from each sensor in the sensor array 10 may vary linearly from a "no pressure" value (e.g., 0V) when no pressure is applied to the sensor to a "maximum pressure" value (e.g., 5V) when maximum pressure is applied to the sensor. Analog sensor signals may be received and converted to digital representation via, for example, an analog-to-digital converter.

As illustrated in FIG. 1A, a designation (e.g., a label, etc.) may be assigned to each sensor in the sensor array 10 to reference a particular sensor in the sensor array 10. The designation may also reference an arm or wrist position where each sensor is located and/or an associated sensor signal corresponding to force and/or pressure detected by each sensor in the sensor array 10 at the corresponding arm or wrist location. As illustrated in FIG. 1B, the sensors 12 may include eight force resistive sensors or pressure sensors corresponding to labels T0-T7 located on the posterior side (top or T) of a wrist of a user. As illustrated in FIG. 1C, the sensors 14 may include eight force resistive sensors or pressure sensors corresponding to labels B0-B7 located on the anterior side (bottom or B) of the wrist of the user. More or fewer sensors may be implemented in the sensor array 10, at any location relative to a wristband, relative to a wrist of a user, etc. Moreover, any designation may be specified, adjusted, predetermined, and so on.

As illustrated in FIG. 1D, individual analog sensor signals that are converted to individual digital sensor signals (e.g., binary 8-bit values, 16-bit values, etc.) for each sensor in the sensor array 10 may be combined into a composite data package 16 based on a sequence of the labels T0-B7. The labels T0-B7 themselves, however, may be used as the digital sensor signals and combined into the composite data package 16 to reference, e.g., particular sensors, force and/or pressure detected by particular sensors, and so on. A size (e.g., width of a sensor signal, width of a data package, etc.) and/or an arrangement (e.g., sequence position in a data package, signals assigned to a data package, etc.) of the composite data package 16 may be specified, adjusted, predetermined, etc., based on any criteria. In one example, the composite data package 16 may include a serial package formed by sixteen bytes wherein half of the composite data package 16 may represent a state of the sensors 12 on the posterior side of the wrist and the other half may represent a state of the sensors 14 on the anterior side of the wrist.

FIG. 2 shows an apparatus 20 that may include logic (e.g., logic instructions, configurable logic, fixed-functionality logic hardware, etc.) configured to implement any of the herein mentioned processes including, for example, determining finger and/or hand position. In the illustrated example, the apparatus 20 includes a controller 22 to process sensor signals from the sensor array 10 (FIGS. 1A-1D), discussed above. The illustrated controller 22 is integral with a wearable device 24 (e.g., a smart watch), and the sensor array 10 may be incorporated onto an internal surface of a wristband coupled with the wearable device 24 (e.g., a wristband of the smart watch). Thus, the controller 22 may determine a position of a hand of a user, which wears the wearable device 24 and makes a gesture with the same hand, based on the sensor signals from the sensors 12, 14 of the sensor array 10.

The controller 22 includes a scheduler 26 to configure a sampling rate for sensor signals that are to be electrically transferred to a receiver 28. The scheduler 26 may, for example, configure that sensor signals are to be collected, output, and/or read at a rate of 20 times per second (e.g., every 50 ms). The sampling rate may be adjusted based on any criteria, including resolution, implementation objectives, proximity of sensors to the wrist, and so on. For example, the scheduler 26 may configure a sampling rate to be higher than every 50 ms based on an implementation objective (e.g., a medical application such as a medical procedure, a training phase application, etc.) that favors relatively higher resolution for more precise determinations (e.g., of finger motion, etc.). The scheduler 26 may also configure a sampling rate to be higher than every 50 ms based on signal attenuation due to, for example, proximity of the sensors 12, 14 to a wrist.

The scheduler 26 may further dynamically configure a sampling rate to be lower than every 50 ms (e.g., capture less often, output less often, read less often, etc.) and/or may maintain a current sampling rate based on similar criteria. The scheduler 26 may also configure a sampling rate to control when sensor signals are provided from the receiver 28 to the controller 22 based on similar criteria. In one example, the receiver 28 may provide analog sensor signals to the controller 22 (e.g., on a periodic basis, a continuous basis, etc.) using conventional time-division multiplexing techniques or as parallel signals based on a sampling rate from the scheduler 26. In another example, the receiver 28 may include an analog-to-digital converter to convert the analog sensor signals to digital sensor signals, which may be provided to the controller 22 based on a sampling rate from the scheduler 26.

The controller 22 further includes a data repository interface 30 that may interface with memory (e.g., cache, random access memory, etc.), with a hard drive (e.g., on-platform storage, removable storage, etc.), and so on. The controller 22 further includes a communication interface 32 that may interface with communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., Institute of Electrical and Electronics Engineers/IEEE 802.15-7, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Thus, the controller 22 may utilize the data repository interface 30 to store, and/or may utilize the communication interface 32 to forward, sensor signals individually, combined in a package, grouped in a set of packages, etc.

The controller 22 further includes a combiner 34 to combine sensor signals into a composite pattern. For example, the combiner 34 may combine digital sensor signals into the composite data package 16 (FIG. 1D), discussed above. Thus, a signature of sensor signals from the sensor array 10 may be captured as a gesture is made and organized into the composite data package 16, which may be forwarded to the data repository interface 30 for storage, may be forwarded to the communication interface 32 to for transmission, may be internally routed within the controller 22 for further processing, and so on. As discussed above, digital sensor signals (e.g., binary values, etc.) may be combined into the composite data package 16 based on a sequence of the labels T0-B7, and/or the labels T0-B7 may be used as the digital sensor signals to reference particular sensors, force and/or pressure detected by particular sensors, etc.

The controller 22 further includes a filter 36 to generate filtered sensor signals from sensor signals. The filter 36 may, for example, modify a signal component of a sensor signal to generate a filtered sensor signal including a modified component. The filter 36 may include, for example, a smoothing filter such as an exponential filter to implement exponential smoothing, a spline filter to implement smoothing spline, and so on. In one example, the filter 36 may determine an average value for a predetermined number of sensor signals read over a filter time window for each sensor in the sensory array 10. Similar to the sampling rate, discussed above, the filter time window may be specified, adjusted, predetermined, etc., based on any criteria. Thus, the filter 36 may include, for example, a moving average filter to determine a moving average value for each sensor and/or may execute the following instructions:

i. for(sensor=0; sensor<NUMSENSORS; sensor++) {
ii. sum=0;
iii.     for(sample=0;       sample<NUMSAMPLES−1; sample++) {
iv. analogSamples[sensor] [sample]=analogSamples[sensor] [sample+1];
v. sum+=analogSamples[sensor][sample+1];
}
vi.          analogSamples[sensor][NUMSAMPLES−1]= analogRawReading[sensor];
vii. sum+=analogSamples[sensor][NUMSAMPLES−1];
viii. analogAvgReading[sensor]=sum/NUMSAMPLES;
}

In one example where the filter time window is 1 s and the sampling rate is every 50 ms, twenty samples are recorded over the filter time window and averaged by the filter 36 for each sensor in the sensory array 10. The outer for-loop (i) begins for a sensor (e.g., sensor=0). For samples in a package (e.g., sample=0), the inner for-loop (iii) shifts the package to the left to discard the oldest sample in the package (iv) and sums all of the samples in the package (v). Thus, the filter 36 shifts and adds all of the sensor signals in a package for a given sensor. Returning to the outer for-loop, the filter 36 adds a new sample into the package (vi) and sums all of the sensor signals in the package (vii). The filter 36 computes an average of the package (viii), which is taken as a present reading for the sensor. The filter 36 implements the process for all sensors, as it goes through all the iterations of the outer for-loop (i).

Accordingly, waveform amplitude for each filtered sensor signal may be smoother and/or more stable relative to corresponding unfiltered sensor signals. In this regard, relatively small movements in a tendon and/or a muscle around a wrist that may translate into relatively large fluctuations in waveform amplitude over a consecutive time period for a same finger and/or hand position may be filtered to generate relatively more smooth and/or stable sensor signals. Smoothing sensor signals (e.g., via a moving average) may cause the relatively small movements to be discarded in the aggregate over the time frame, which relatively simplify subsequent signal processing.

The controller 22 further includes a sorter 38 to sort a filtered sensor signal based on a modified signal component of the filtered sensor signal. The sorter 38 may, for example, sort filtered digital sensor signals based on smoothed amplitude (e.g., highest to lowest, lowest to highest, etc.) and output sorted filtered digital sensor signals to the combiner 34 for combination into a composite data package. The sorter 38 may also obtain a composite data package including filtered digital sensor signals from the combiner 34 and sort the filtered digital sensor signals within the composite data package. Thus, relatively smooth and/or stable sensor signals may be sorted to generate substantially reproducible and/or identifiable patterns that account for relatively small variations in relative position of sensor signals in patterns over time.

The controller 22 further includes an aggregator 40 to group composite patterns into a set of composite patterns. In one example, a user may make a hand gesture during a set-up and/or training phase and the aggregator 40 may group composite patterns into a set during the training phase. The user may, for example, be prompted to make a hand gesture during a training time window via a graphical prompt from a graphical user interface, an audio prompt from an audible user interface, a tactile prompt from a tactile user interface, and so on. Similar to the sampling rate and the filter time window, discussed above, the training time window may be specified, adjusted, predetermined, etc., based on any criteria. When the user makes the hand gesture (e.g., in response to a prompt, in response to user initiation, etc.), a relatively stable set of sensor patterns that account for relatively small variations in sensor signal position between the sensor patterns may be provided by the aggregator 40. The sets may be relatively stable since a region where tendons and/or muscles are physically positioned does not substantially change although the tendon and/or the muscle may move.

In one example, three sixteen-byte composite data packages may be generated during a training time window of 3 s based on a sampling rate of every 50 ms (e.g., 20 reads in the last second) and a filter time window of 1 s that generates sixteen moving average one-byte values three consecutive times. A sequence position of one or more of the sixteen filtered digital sensor signals (e.g., sixteen moving average one-byte values) in one of the sixteen-byte composite data packages generated for a particular second may vary from a sequence position of the corresponding filtered digital sensor signals in another of the sixteen-byte composite data packages generated for another second. The aggregator 40 may group the three sixteen-byte composite data packages in a set (e.g., a cluster) to account for the relatively small variances in the relative sequence positions. Notably, the size of the set may vary between finger and/or hand positions since some positions may provide very stable signals and others may provide more volatile signals. Thus, some sets might eventually be bigger than others, depending on the corresponding finger and/or hand positions. In addition, a training window may vary in length depending on the positions under training.

Notably, a variation in sequence position may be localized to an area of a composite pattern, and/or a sequence position of a majority of sensor signals may be conserved among composite patterns in one set. Moreover, a variation in sequence position may involve a relatively small number of sensor signals (e.g., two, five, minority, etc.). In the illustrated example, the controller 22 further includes an associator 42 to associate a relatively stable set of sensor patterns with a predetermined hand and/or finger position. For example, the hand gesture made by the user during the training phase in the example above may include a "Thumb up" position, and the associator 42 may associate the "Thumb up" position with the set of composite data packages generated when the gesture including the "Thumb up" position was made.

The controller 22 further includes a locator 44 to determine a location of each sensor on a wrist of a user. The locator 44 may determine the location of each sensor in response to an event (e.g., when movement of a sensor satisfies a threshold, in response to a request, etc.), periodically (e.g., based on a predetermined period, etc.), and so on. The locator 44 may, for example, receive data from an accelerometer, a gyroscope, etc., when movement of a sensor satisfies a threshold (e.g., acceleration threshold, orientation threshold, etc.) and determine a present location of each sensor of the sensory array 10 based on the data (e.g., acceleration data, orientation data, etc.). The locator 44 may also determine the present location of each sensor of the sensory array 10 based on a composite pattern generated in response to, for example, a calibration hand gesture. In this regard, the user may be prompted to make a calibration hand gesture and/or the user may initiate the calibration hand gesture to generate the composite pattern.

The controller 44 further includes a reorganizer 46 to modify a composite pattern to reflect a present location of a sensor. For example, a wristband rotated after a training phase may cause composite patterns generated during the training phase to no longer be valid, and the reorganizer 46 may re-map the composite patterns (e.g., in response to an event, periodically, etc.) to correct for the rotation. The locator 44 may, for example, provide rotation data corresponding to rotation direction (e.g., left, right, etc.), magnitude of rotation (e.g., by one sequence position, etc.), and so on, and the reorganizer 46 may re-map a composite pattern generated during the training phase to rename a sensor signal in the composite pattern based on the rotation data.

The locator 44 may, for example, determine that a sensor in the sensor array 10 corresponding to a label T0 is now in a location where a sensor in the sensor array 10 corresponding to a label T1 was during the training phase, and the reorganizer 46 may rename the sensor corresponding to the label T0 in a composite data package (e.g., a composite data package in a set of composite data packages, etc.) with the label T1 based on the determination from the locator 44. Similarly, a sensor in the sensor array 10 corresponding to a label T2 may be renamed with the label T1 when the sensor array 10 is rotated (e.g., counterclockwise) one sequence position. Thus, a relatively simple re-mapping process may obviate a need to perform another training phase.

The controller 22 further includes a comparator 48 to compare a composite pattern with a set of composite patterns. The comparator 48 may implement a pair-wise comparison between a new composite data package and each composite data package of a set of composite data packages generated during a training phase. The comparator 48 may perform the comparison sequentially or in parallel, in any order. In one example, comparator 48 may execute a comparison after the reorganizer 46 executes re-mapping. In another example, the comparator 48 may execute a comparison without delay when, for example, the sensor array 10 is being presently used in a similar manner as used in the training phase and composite patterns from the training phase remain valid.

The controller 22 further includes a selector 50 to evaluate a composite pattern and select a set of composite patterns for comparison. The selector 50 may, for example, evaluate a sequence position of filtered digital sensor signals in a first, intermediate, last, entire, etc., area of a composite data package (e.g., a first area with a length of 2 signals, etc.) to determine whether a set of composite data packages satisfies a threshold (e.g., number of sequence matches, etc.). The selector 50 may also, for example, evaluate the sequence position of filtered digital sensor signals in a most important area of a composite data package (e.g., most conserved region, etc.) to determine whether a set of composite data packages satisfies a threshold (e.g, number of sequence matches, etc.).

Additionally, the selector 50 may perform an evaluation on a sub-set of composite patterns. For example, the selector 50 may perform an evaluation on one composite data package of a set of composite data packages, a first composite data package of a set of composite data packages, an intermediate composite data package of a set of composite data packages, a last composite data package of a set of composite data packages, all composite data packages of a set of composite data packages, and so on, sequentially or in parallel, in any order. Similarly, the selector 50 may perform the evaluation on one set of composite data packages, all sets of composite data packages, and so on, sequentially or in parallel, in any order.

The controller 22 further includes an assignor 52 to assign a weight value to a set of composite pattern. For example, the assignor 52 may assign a weight value to each composite data package in a set of composite data packages to indicate a degree of match between each composite data package and a new composite data package. The weight value may correspond to any scale, including a percentage scale (e.g., 100% match, 0% match, etc.), an integer scale (e.g., 16 signals out of 16 signals, 0 signals out of 16 signals, etc.), and so on. Notably, while the composite patterns recorded during a training phase may be generated once, new composite patters recorded to determine finger and/or hand position may be generated on a continuous basis for comparison by the comparator 48.

The controller 22 further includes a classifier 54 to determine finger and/or hand position based on a composite pattern. For example, the classifier 54 may determine that a user is making a hand gesture including a finger and/or hand position associated with a set of composite patters including a composite pattern with a best weight value (e.g., highest value, etc.). For example, the user may be making a hand gesture including a "Thumbs up" position, and the classifier 54 may determine that a set of composite data packages associated with the "Thumbs up" position includes a composite data package having a highest degree of match based on the weight value. Thus, the classifier 54 may infer that the current position of the hand is in the "Thumbs up" position.

The controller 22 further includes a function operator 56 to generate control function data for a function of a computing platform based on the finger and/or hand position. The computing platform may include, for example, a laptop, personal digital assistant (PDA), media content player, imaging device, mobile Internet device (MID), any smart device such as a wireless smart phone, smart tablet, smart TV, smart watch, computer server, gaming platform, and so on, or combinations thereof. In one example, the computing platform may be separate from the sensor array 10, the controller 22, the wearable device 24, and so on. In another example, the computing platform may be integral with the sensor array 10, the controller 22, the wearable device 24, and so on.

Accordingly, the function operator 56 may generate control function data for a function of the wearable device 24, a function of a computing platform coupled with the wearable device 24, and so on. The control data may control, for example, operation of a drone (e.g., a vehicle, etc.), a surgical instrument, and so on. In another example, a user may implement two wristbands and make hand gestures to generate control function data for a same computing platform (e.g., control a game the user is playing with hands).

While examples have provided various components of the sensor array 10 and/or the apparatus 20 for illustration purposes, it should be understood that one or more components of the sensor array 10 and/or the apparatus 20 may reside in the same and/or different physical and/or virtual locations, may be combined, omitted, bypassed, re-arranged, and/or be utilized in any order. In one example, one or more components of the sensor array 10 may physically reside on the same computing platform as one or more components of the apparatus 20. In another example, one or more components of the apparatus 20 may be distributed among various computing platforms to provide distributed finger and/or hand position determination processes. Moreover, any or all components of the array 10 and/or the apparatus 20 may be automatically implemented (e.g., without human intervention, etc.). For example, the classifier 54 may automatically determine finger and/or hand position based on a composite pattern.

Figure 3A:
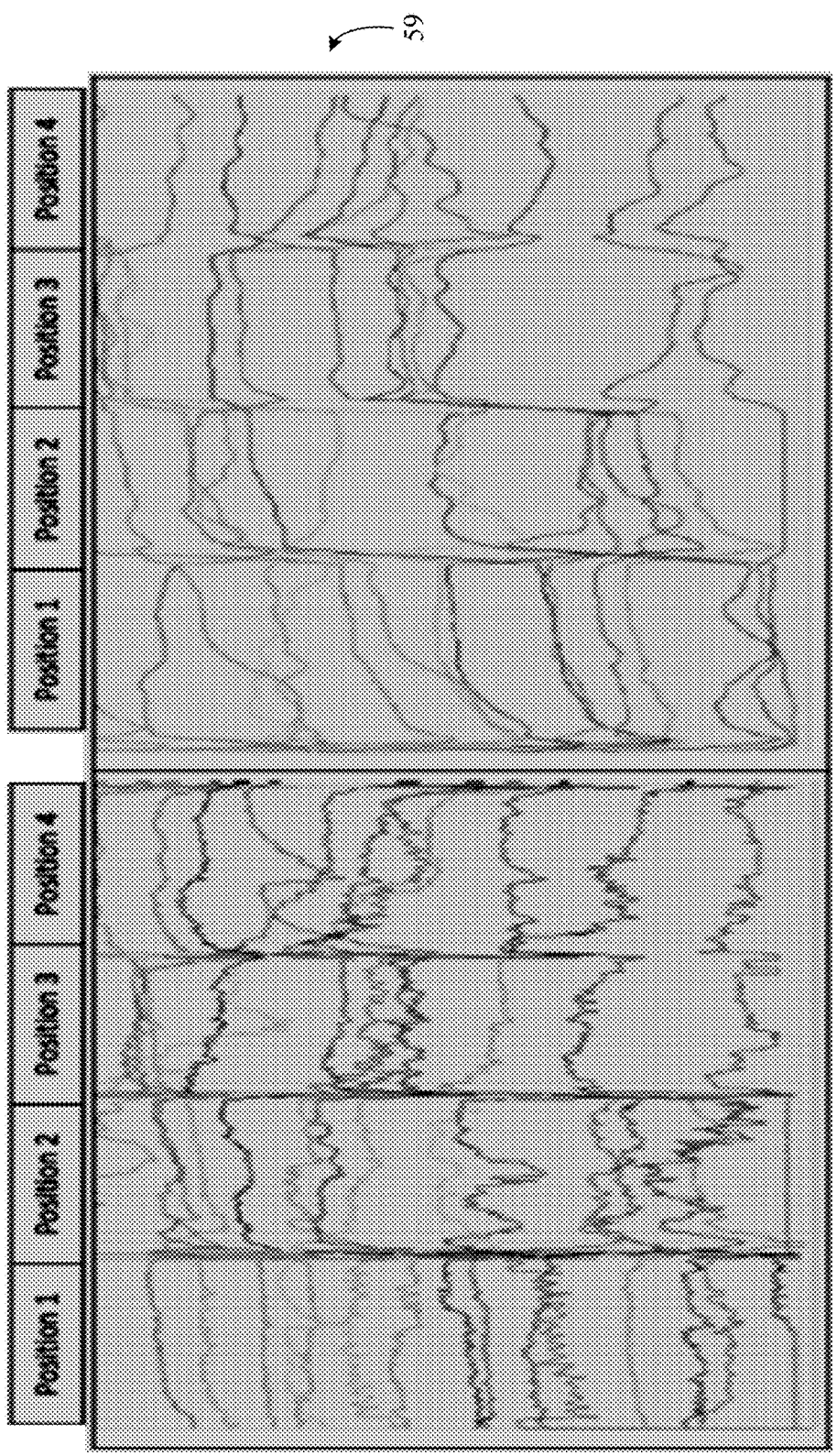

Turning now to FIGS. 3A-3B, example waveforms 57 for unfiltered sensor signals corresponding to finger and/or hand positions (1, 2, 3, 4), and waveforms 59 for filtered sensor signals corresponding to the finger and/or hand positions (1, 2, 3, 4) that are combined into composite data packages 60 (60a-60l) and grouped in sets 62 (62a-62d) of composite data packages, are shown according to an embodiment. In this example, each position corresponds to gestures including a position of the fingers and/or hand such as "Index expanded; others at rest" position (1), "Index and middle fingers expanded; others contracted" position (2), "Index, middle, and ring fingers expanded; others contracted" position (3), and "Index, middle, ring, and baby fingers expanded; thumb contracted" position (4). Other positions may include, for example, "Thumbs up" position, "All fingers contracted (fist)" position, "Love and peace" position, "Hand at rest (no contraction or expansion)" position, and so on.

As illustrated in FIG. 3A, the vertical axis corresponds to sensor data values read by the sensors of a sensor array. Each sensor reading may vary, for example, from 0 to 255 decimal. Thus, the vertical axis may correspond to amplitude of the waveforms 57, 59. The horizontal axis corresponds to sensor readings over time (e.g., a time frame of 5 s intervals, etc.). The horizontal axis may correspond to, for example, a training time window for each position. Relatively small movements in a tendon and/or a muscle around a wrist may translate into relatively large fluctuations in amplitude of the waveforms 57 over a time frame for a same hand gesture, and the waveforms 57 may be filtered to normalize (e.g., smooth, etc.) the sensor signals and generate the waveforms 59 having smoothed amplitudes. A filter (e.g. moving average filter) generates smoother waveforms 59 that are automatically graphically sorted based on amplitude.

As illustrated in FIG. 3B, sensor signals corresponding to the waveforms 59 may be combined into the composite data packages 60 and/or sorted based on the smoothed amplitudes. Relatively small disturbances in tendons and/or muscles when the user makes a gesture including a position (e.g., 1, etc.) over a time period may cause sequence positions of sensor signals to minimally vary between composite data packages when the sensor signals are sorted based on smoothed amplitude. For example, a composite data package recorded for position (1) may include [B5,B2, B1,B4,T0,B6,B0,T1,T3,T2,T7,T5,T4,B3,B7,T6] at one time within a time frame and [B5,B2,B1,T0,B4,B6,B0,T1, T3,T7,T2,T5,T4,B3,B7,T6] at another time within the time frame since relatively small disturbances in tendons and/or muscles may cause T0, B4 and T7, T2 to be inverted in sequence position at different times.

The composite data packages 60 are grouped in the sets 62 to train the system with known sets of patterns for each expected physical position of a hand. For example, the set 62a is associated with the "Thumb up" position and includes three composite data packages 60a, 60b, 60c, the set 62b is associated with the "Index expanded; others at rest" position (1) and includes the data packages 60d, 60e, 60g, and so on. The data packages 60 include a relatively small number of digital filtered sensor signals whose sequence position varies slightly and a majority (e.g., most) of digital filtered sensor signals that remain stable in a well-defined pattern (e.g., well-defined sequence position). For example, the position of T0, B1, B2, B3 varies between the composite data packages 60a, 60b, 60c while the other filtered digital sensor signals remain stable in a well-defined pattern that is conserved across the composite data packages 60a, 60b, 60c.

The relative stability of patterns provided by the composite data packages 60 and/or the ability to differentiate between, or account for, relatively small variations between patterns may allow for reliable and/or reproducible classification of a new pattern. For example, a new composite data package [T2,T4,T5,B3,B7,T3,B1,T0,T1,B4, B0,T7,B2,T6, B5,B6] may be recorded when a user makes a hand gesture, which may be filtered and sorted based on smoothed amplitude. The new composite data package may be compared with each of the composite data packages 60 in the sets 62. For example, a pairwise comparison may be accomplished as a block operation that compares each digital filtered sensor signal of the new composite data package with each filtered digital sensor signal of a package of the composite data packages 60 in parallel.

Each of the composite data packages 60 may be assigned a weight value indicating a degree of match. Thus, for example, the set 62a may be assigned a weight of "three" that indicates three filtered digital sensor signals match between the new composite pattern and a closest matched package of the composite data packages 60a, 60b, 60c. Similarly, the set 62b may be assigned a weight of "fourteen", the set 62c may be assigned a weight of "four", and the set 62d may be assigned a weight of "zero". Thus, it may be inferred that a present position of a hand is "Index expanded; others at rest" position (1). In addition, control function data may be generated based on the finger and/or hand position to control a function of a computing platform.

Notably, when the composite data packages 60 vary to an unacceptable extent (e.g., over a threshold, etc.) within corresponding sets 62, the system and/or the user may reject outliers during a training phase (e.g., based on the threshold, etc.) to force a better similarity among the composite data packages 60 (e.g., arrays) in the corresponding sets 62. In addition, for example if a higher weight is determined for the "Thumbs up" position when a (1) position is formed, the system may self-correct the next time a new composite data package is recorded. Moreover, a new training phase may reform the corresponding troubled set if an issue persists. Such correction techniques may be implemented relatively infrequently since patterns are generally sufficiently stable. Moreover, as discussed above, matches that provide erroneous results due to movement of the sensors may be minimized and/or resolved via calibration processes.

Figure 4:
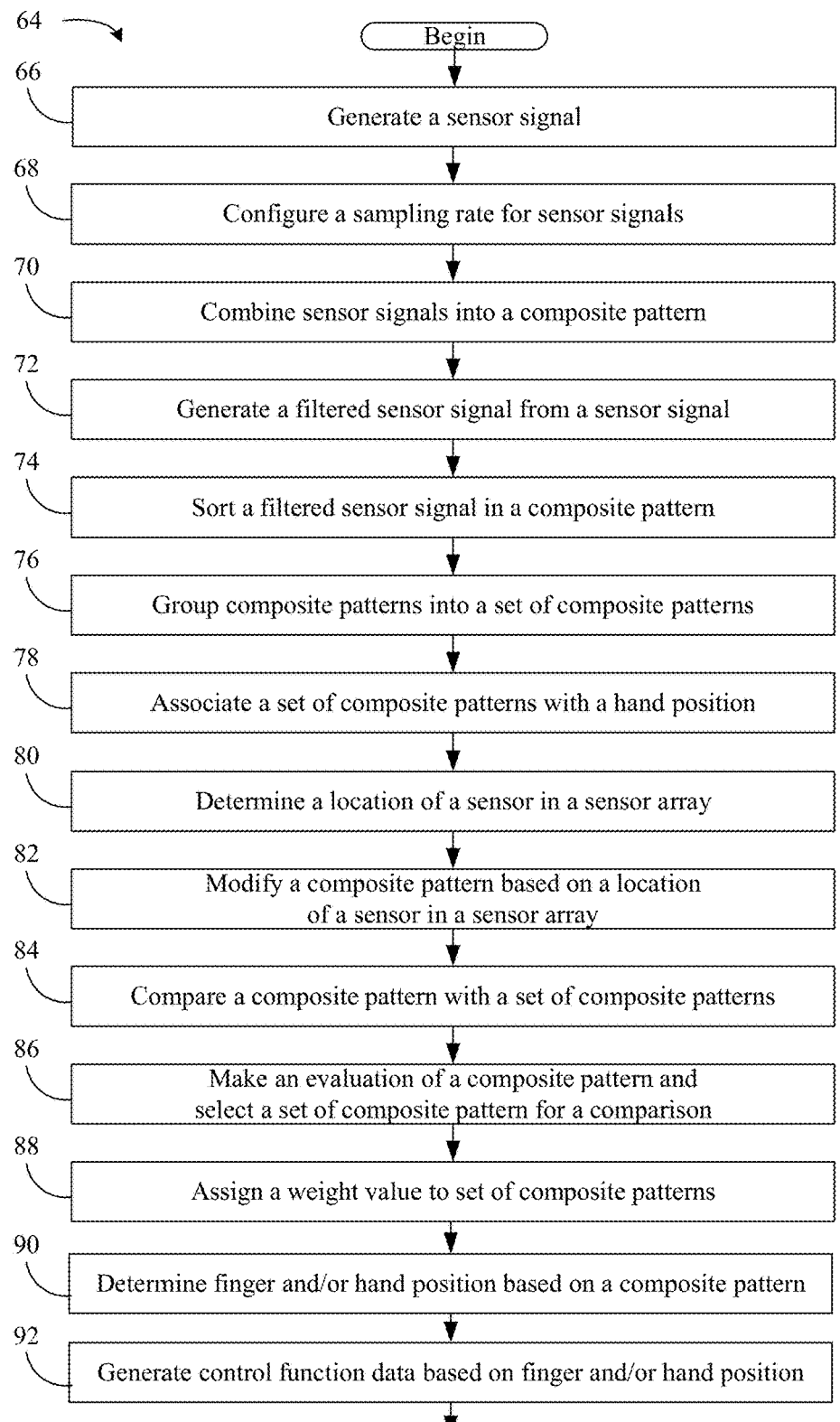
FIG. 4 is an illustration of an example of a method to determine finger and/or hand position according to an embodiment.

FIG. 4 shows a method 64 to determine finger and/or hand position according to an embodiment. The method 64 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 64 may be written in any combination of one or more programming languages, including an object oriented programming language such as JAVA, SMALLTALK, C++ or the like and conventional procedural programming languages, such as the "C" programming language or similar programming languages.

Illustrated processing block 66 provides for generating a sensor signal. For example, block 66 may generate sensor signals corresponding to a level of applied force and/or pressure. Block 66 may, for example, generate an analog sensor signal and/or convert the analog sensor signal to a digital sensor signal for a sensor in a sensor array. Illustrated processing block 68 provides for configuring a sampling rate for a sensor signal that is to be transferred to a receiver, a controller, memory, a communications interface, and so on. Block 68 may adjust the sampling rate based on any criteria, including resolution, implementation objectives, proximity of sensors to the wrist, and so on. Thus, block 66 may utilize the sampling rate from block 68.

Illustrated processing block 70 provides for combining sensor signals into a composite pattern. Block 70 may, for example, combine individual n-bit digital sensor signals for each sensor in a sensor array into a composite data package. For example, block 70 may combine sixteen digital sensor signals into one composite data package based on data that specifies a width of the composite data package is sixteen bytes and an arrangement of the composite data package includes one byte for each sensor.

Illustrated block 72 provides for generating a filtered sensor signal from a sensor signal. Block 72 may, for example, modify a signal component of a sensor signal to generate a filtered sensor signal including a modified signal component, such as modified amplitude, a modified period, modified frequency, and so on. In one example, block 72 may implement exponential smoothing, smoothing spline, moving average smoothing, and so on. Thus, amplitude of a waveform for a filtered sensor signal may be smoother and/or more stable relative to a corresponding unfiltered sensor signal.

Illustrated block 74 provides for sorting a filtered sensor signal in a composite pattern based on a modified signal component of the filtered sensor signal. For example, block 74 may sort each filtered digital sensor signal in a composite data package based on smoothed amplitude of each filtered digital sensor signal. Block 74 may, for example, sort filtered digital sensor signals from highest smoothed amplitude to lowest smoothed amplitude, from lowest smoothed amplitude to highest smoothed amplitude, and so on.

Illustrated block 76 provides for grouping composite patterns into a set of composite patterns. In one example, block 76 may group composite patterns into a set during a training phase. Thus, when a user makes a hand gesture (e.g., in response to a prompt, in response to a user initiation, etc.), block 76 may provide a relatively stable set of sensor patterns that account for relatively small variations in relative sensor signal position between the sensor patterns. Illustrated processing block 78 provides for associating a relatively stable set of sensor patterns with a predetermined finger and/or hand position during, for example, the training phase.

Illustrated processing block 80 provides for determining a location of a sensor in a sensor array. Block 80 may, for example, determine the location based on acceleration data, orientation data, and so on. Block 80 may also determine the location based on a composite pattern generated in response to a calibration hand gesture made by a user. Illustrated processing block 82 provides for modifying a composite pattern that is generated during a training phase to reflect a present location of a sensor in a sensor array. For example, a wristband may be rotated such that composite patterns generated during a training phase may no longer be valid, and block 82 may re-map the composite patterns to correct for the rotation based on data from block 80.

Illustrated processing block 84 provides for comparing a composite pattern with a set of composite patterns. For example, block 84 may implement a pair-wise comparison between a new composite data package and each composite data package of a set of composite data packages generated, for example, during a training phase. Block 84 may, for example, perform the comparison sequentially or in parallel, in any order. Illustrated processing block 86 provides for making an evaluation of a composite pattern and making a selection of a set of composite patterns for comparison based on the evaluation. Block 86 may evaluate a sub-set of composite patterns, and/or areas thereof, in a set of composite patterns to determine which sets are selected for comparison.

Illustrated processing block 88 provides for assigning a weight value to a set of composite patterns. Block 88 may, for example, assign a weight value to a composite data package in a set of composite data packages to indicate a degree of match between, for example, each composite data package and a new composite data package. Illustrated block 90 provides for determining finger and/or hand position based on a composite pattern. Block 90 may, for example, determine that a user is making a hand gesture including a finger and/or hand position associated with a set of composite patterns that includes a composite pattern with a best weight value (e.g., highest value, etc.).

Illustrated processing block 92 provides for generating control function data for a function of a computing platform based on finger and/or hand position. Block 92 may, for example, generate control function data to control an operation of a smart watch, a drone, a game console, etc., which may be integral or separate from one or more blocks of the method 64. While independent blocks and/or a particular order has been shown for illustration purposes, it should be understood that one or more of the blocks of the method 64 may be combined, omitted, bypassed, re-arranged, and/or flow in any order. Moreover, any or all blocks of the method 64 may be automatically implemented (e.g., without human intervention, etc.). For example, block 90 may automatically determine finger and/or hand position based on a composite pattern.

Figure 5:
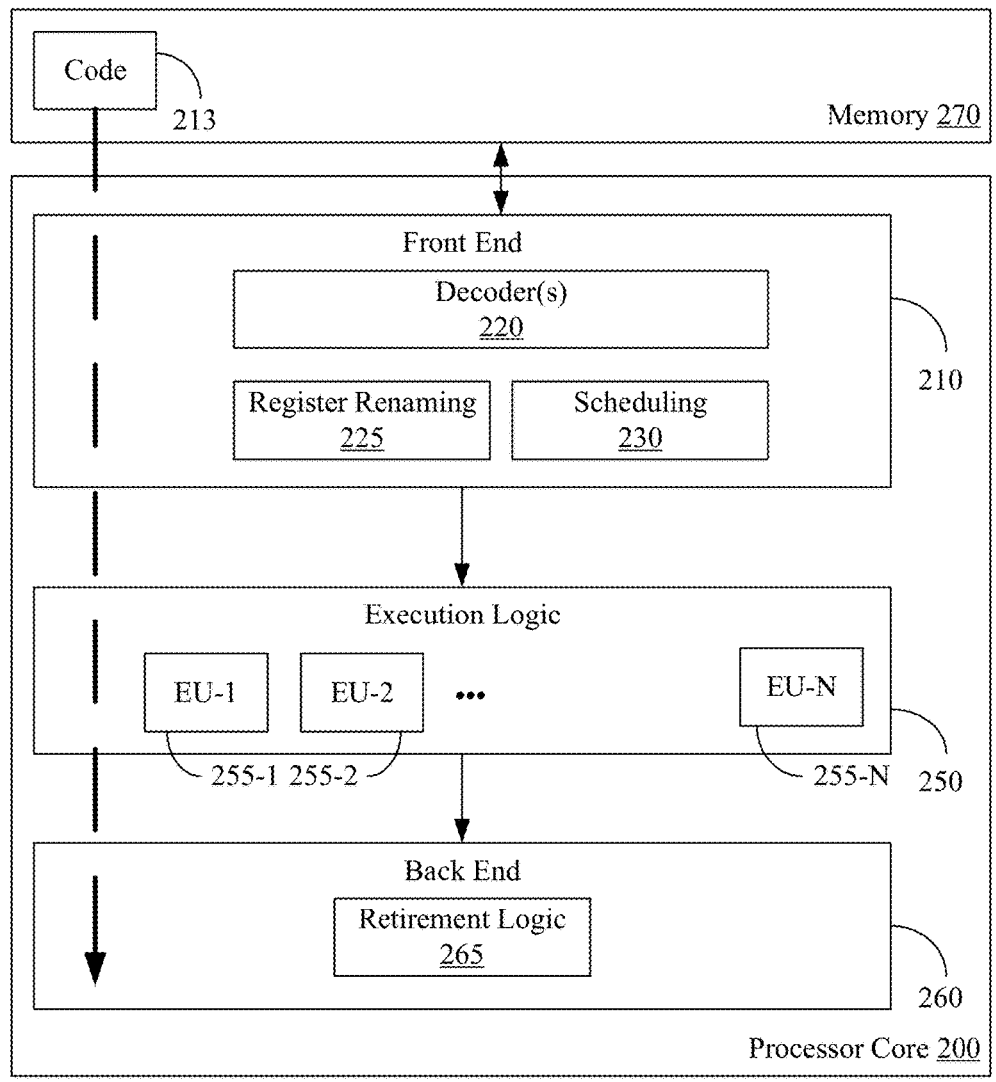
FIG. 5 is a block diagram of an example of a processor according to an embodiment.

Turning now to FIG. 5, a processor core 200 is shown according to one embodiment. The processor core 200 may be the core for any type of processor, such as a microprocessor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the sensor array 10 (FIG. 1), the apparatus 20 (FIG. 2), the waveforms 57, 59 and composite data packages 60 in the sets 62 (FIGS. 3A-3B), and/or the method 64 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core

200. For example, a processing element may include memory control logic along with the processor core 200. The processing element may include I/O control logic and/or may include I/O control logic integrated with memory control logic. The processing element may also include one or more caches.

Figure 6:
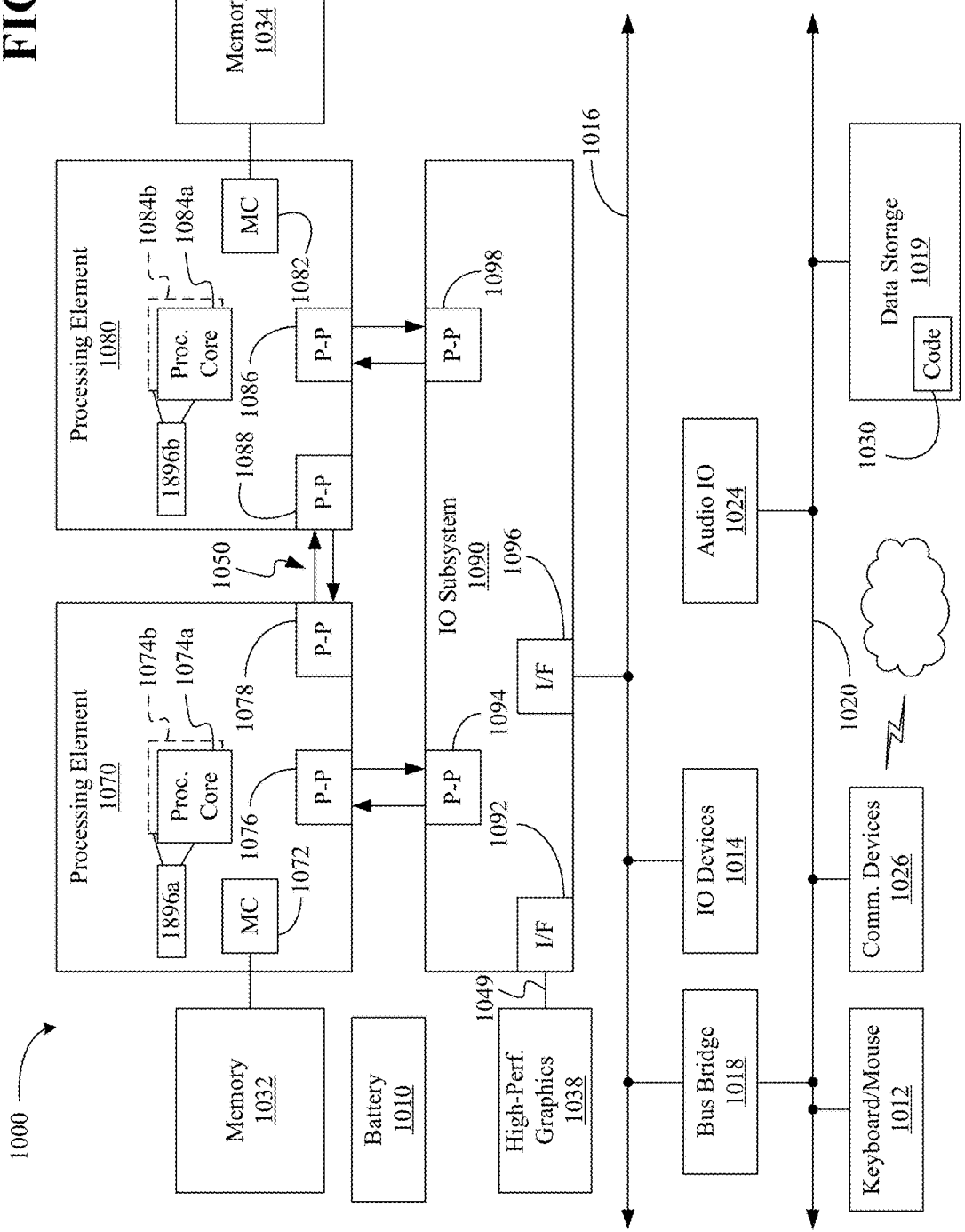
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 5.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors, etc.) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The illustrated code 1030 may implement the sensor array 10 (FIG. 1), the apparatus 20 (FIG. 2), the waveforms 57, 59 and composite data packages 60 in the sets 62 (FIGS. 3A-3B), and/or the method 64 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include an apparatus to determine finger and/or hand position comprising a plurality of sensors on a wrist of a user to provide a plurality of sensor signals, a filter to generate a plurality of filtered sensor signals from the plurality of sensor signals, wherein each filtered sensor signal is to include a modified signal component, a sorter to sort each filtered sensor signal in a composite pattern based on each modified signal component, and a classifier to determine finger and/or hand position based on the composite pattern, wherein control function data is to be generated for a function of a computing platform based on the finger and/or hand position.

Example 2 may include the apparatus of Example 1, further including a scheduler to configure a signal transfer rate for the plurality of sensor signals, a combiner to combine the plurality of sensor signals into the composite pattern, and a function operator to generate the control function data.

Example 3 may include the apparatus of any one of Examples 1 to 2, further including an aggregator to group a plurality of composite patterns into a set of composite patterns, wherein each composite pattern is to include a plurality of filtered sensor signals, and an associator to associate a predetermined finger and/or hand position with a set of composite patterns.

Example 4 may include the apparatus of any one of Examples 1 to 3, further including a comparator to compare the composite pattern with each composite pattern of a set of composite patterns and an assignor to assign a weight value to each composite pattern indicating a degree of match, wherein the classifier is to determine the finger and/or hand position based on the weight value.

Example 5 may include the apparatus of any one of Examples 1 to 4, further including a selector to make an evaluation of a sequence position of a plurality of filtered sensor signals of a composite pattern in a set of composite patterns and select a set of composite patterns based on the evaluation to be compared with the composite pattern.

Example 6 may include the apparatus of any one of Examples 1 to 5, further including a locator to determine a location of each sensor on the wrist of the user and a reorganizer to modify a sequence position of a plurality of filtered sensor signals of a composite pattern based on the location.

Example 7 may include the apparatus of any one of Examples 1 to 6, wherein the filter is to generate a plurality of filtered digital sensor signals from a plurality of digital sensor signals to generate the plurality of filtered sensor signals, and wherein the sorter is to sort each filtered digital sensor signal in a composite data package to sort each filtered sensor signal.

Example 8 may include the apparatus of any one of Examples 1 to 7, wherein the modified signal component of each filtered digital sensor signal is to include a smoothed amplitude, and wherein a sequence position of each filtered digital sensor signal of the composite data package is to be based on the smoothed amplitude.

Example 9 may include the apparatus of any one of Examples 1 to 8, wherein the filter is to determine an average value for a predetermined number of digital sensor signals over a filter time window for each sensor to generate the plurality of filtered digital sensor signals.

Example 10 may include at least one computer readable storage medium comprising a set of instructions, which when executed by a processor, cause the processor to generate a plurality of filtered sensor signals from a plurality of sensor signals that are to be generated by a plurality of sensors on a wrist of a user, wherein each filtered sensor signal is to include a modified signal component, sort each filtered sensor signal in a composite pattern based on each modified signal component, and determine finger and/or hand position based on the composite pattern, wherein control function data is to be generated for a function of a computing platform based on the finger and/or hand position.

Example 11 may include the at least one computer readable storage medium of Example 10, wherein the instructions, when executed, cause the processor to configure a signal transfer rate for the plurality of sensor signals and combine the plurality of sensor signals into the composite pattern.

Example 12 may include the at least one computer readable storage medium of any one of Examples 10 to 11, wherein the instructions, when executed, cause the processor to group a plurality of composite patterns into a set of composite patterns, wherein each composite pattern is to include a plurality of filtered sensor signals and associate a predetermined finger and/or hand position with a set of composite patterns.

Example 13 may include the at least one computer readable storage medium of any one of Examples 10 to 12, wherein the instructions, when executed, cause the processor to compare the composite pattern with each composite pattern of a set of composite patterns and assign a weight value to each composite pattern indicating a degree of match, wherein the finger and/or and position is to be determined based on the weight value.

Example 14 may include the at least one computer readable storage medium of any one of Examples 10 to 13, wherein the instructions, when executed, cause the make an evaluation of a sequence position of a plurality of filtered sensor signals of a composite pattern in a set of composite patterns and select a set of composite patterns based on the evaluation to be compared with the composite pattern.

Example 15 may include the at least one computer readable storage medium of any one of Examples 10 to 14, wherein the instructions, when executed, cause the processor to determine a location of each sensor on the wrist of the user and modify a sequence position of a plurality of filtered sensor signals of a composite pattern based on the location.

Example 16 may include the at least one computer readable storage medium of any one of Examples 10 to 15, wherein the instructions, when executed, cause the processor to generate a plurality of filtered digital sensor signals from a plurality of digital sensor signals to generate the plurality of filtered sensor signals and sort each filtered digital sensor signal in a composite data package to sort each filtered sensor signal.

Example 17 may include the at least one computer readable storage medium of any one of Examples 10 to 16, wherein the modified signal component of each filtered digital sensor signal is to include a smoothed amplitude, and wherein a sequence position of each filtered digital sensor signal of the composite data package is to be based on the smoothed amplitude.

Example 18 may include the at least one computer readable storage medium of any one of Examples 10 to 17, wherein the instructions, when executed, cause the processor to determine an average value for a predetermined number of digital sensor signals over a filter time window for each sensor to generate the plurality of filtered digital sensor signals.

Example 19 may include a method to determine finger and/or hand position comprising generating a plurality of filtered sensor signals from a plurality of sensor signals that are generated by a plurality of sensors on a wrist of a user, wherein each filtered sensor signal includes a modified signal component, sorting each filtered sensor signal in a composite pattern based on each modified signal component, and determining finger and/or hand position based on the composite pattern, wherein control function data is generated for a function of a computing platform based on the finger and/or hand position.

Example 20 may include the method of Example 19, further including configuring a signal transfer rate for the plurality of sensor signals and combining the plurality of sensor signals into the composite pattern.

Example 21 may include the method of any one of Examples 19 to 20, further including grouping a plurality of composite patterns into a set of composite patterns, wherein each composite pattern includes a plurality of filtered sensor signals, and associating a predetermined finger and/or hand position with a set of composite patterns.

Example 22 may include the method of any one of Examples 19 to 21, further including comparing the composite pattern with each composite pattern of a set of composite patterns, and assigning a weight value to each composite pattern indicating a degree of match, wherein the finger and/or hand position is determined based on the weight value.

Example 23 may include the method of any one of Examples 19 to 22, further including making an evaluation of a sequence position of a plurality of filtered sensor signals of a composite pattern in a set of composite patterns and selecting a set of composite patterns based on the evaluation to be compared with the composite pattern.

Example 24 may include the method of any one of Examples 19 to 23, further including determining a location of each sensor on the wrist of the user and modifying a sequence position of a plurality of filtered sensor signals of a composite pattern based on the location.

Example 25 may include the method of any one of Examples 19 to 24, further including generating a plurality of filtered digital sensor signals from a plurality of digital sensor signals to generate the plurality of filtered sensor signals and sorting each filtered digital sensor signal in a composite data package to sort each filtered sensor signal.

Example 26 may include the method of any one of Examples 19 to 25, wherein the modified signal component of each filtered digital sensor signal includes a smoothed amplitude, and wherein a sequence position of each filtered digital sensor signal of the composite data package is based on the smoothed amplitude.

Example 27 may include the method of any one of Examples 19 to 26, further including determining an average value for a predetermined number of digital sensor signals over a filter time window for each sensor to generate the plurality of filtered digital sensor signals.

Example 28 may include an apparatus to determine finger and/or hand position comprising means for performing the method of any one of examples 19 to 27.

Thus, techniques described herein provide for interpreting analog sensor signals and the inference of their combination into meaningful finger and/or hand position. In one example, filtered and/or sorted sensor signals may be further organized into patterns, and classified to infer the finger and/or hand position by matching newly collected patterns with expected patterns. Relatively inexpensive pressure sensors may be implemented with relatively lightweight process to obtain relatively high precision to infer finger and/or hand position.

For example, collection may involve sensors around a wrist that provides constant analog readings of each individual sensor reflecting tendon and/or muscle pressure exerted on resistive pressure sensors. The sensors may be scanned, e.g., 20 times per second (every 50 ms). The analog signals generated may vary considerably over a period of time due to relatively small movements in the tendon or muscle. Techniques described herein may implement filtering to provide a relatively more stable signal. In one example, moving average filtering may be implemented. In addition, the filtered signals may be sorted according to their amplitudes.

Depending on where a pattern is collected over a time frame, patterns within the time frame may include relatively small variations in relative position of sensor signals in the patterns. For example, amplitudes of sensor signals may be relatively close to one another and a relatively small disturbance in the tendon and/or muscle may cause the position of the sensor signals to change (e.g., inverted, etc.) in the patterns during the sorting process. Techniques descried herein may also implement an initial clustering process to train a system with known sets of patterns for each expected physical position of the hand. Each cluster may include a set of signals that vary relatively slightly, wherein most of the signals may remain stable in a well-defined pattern. Clustering may be accomplished once, with re-mapping as needed, while classification may be implemented on a continuous basis. In one example, classification involves ranking a current pattern against patterns in a cluster, wherein a comparison may determine a distance between the current pattern and patterns in the cluster. A weight may be determined for each cluster that represents, for example, a number of matches between the elements of the current pattern and a closest pattern in the cluster.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus comprising:
   a plurality of sensors on a wrist of a user to provide a plurality of sensor signals,
   a filter to generate a plurality of filtered sensor signals from the plurality of sensor signals, wherein each filtered sensor signal is to include a modified signal component that has a smoothed amplitude,
   a sorter to sort each filtered sensor signal in a composite data package, and in a composite pattern based on each modified signal component, wherein a sequence position of each filtered sensor signal of the composite data package is to be based on the smoothed amplitude, and
   a classifier to determine finger and/or hand position based on the composite pattern, wherein control function data is to be generated for a function of a computing platform based on the finger and/or hand position.

2. The apparatus of claim 1, further including,
   a scheduler to configure a signal transfer rate for the plurality of sensor signals,
   a combiner to combine the plurality of sensor signals into the composite pattern, and
   a function operator to generate the control function data.

3. The apparatus of claim 1, further including,
   an aggregator to group a plurality of composite patterns into a set of composite patterns, wherein each composite pattern is to include the plurality of filtered sensor signals, and
   an associator to associate a predetermined finger and/or hand position with the set of composite patterns.

4. The apparatus of claim 1, further including,
   a comparator to compare the composite pattern with each composite pattern of a set of composite patterns, and
   an assignor to assign a weight value to each composite pattern indicating a degree of match, wherein the classifier is to determine the finger and/or hand position based on the weight value.

5. The apparatus of claim 1, further including a selector to,
   make an evaluation of a sequence position of the plurality of filtered sensor signals of a composite pattern in a set of composite patterns, and
   select a set of composite patterns based on the evaluation to be compared with the composite pattern.

6. The apparatus of claim 1, further including,
   a locator to determine a location of each sensor on the wrist of the user, and
   a reorganizer to modify a sequence position of the plurality of filtered sensor signals of a composite pattern based on the location.

7. The apparatus of claim 1, wherein the filter is to determine an average value for a predetermined number of sensor signals over a filter time window for each sensor to generate the plurality of filtered sensor signals.

8. At least one non-transitory computer readable storage medium comprising a set of instructions, which when executed by a processor, cause the processor to:
   generate a plurality of filtered sensor signals from a plurality of sensor signals that are to be generated by a plurality of sensors on a wrist of a user, wherein each filtered sensor signal is to include a modified signal component that has a smoothed amplitude;
   sort each filtered sensor signal in a composite data package, and in a composite pattern based on each modified signal component, wherein a sequence position of each filtered sensor signal of the composite data package is to be based on the smoothed amplitude; and
   determine finger and/or hand position based on the composite pattern, wherein control function data is to be generated for a function of a computing platform based on the finger and/or hand position.

9. The at least one non-transitory computer readable storage medium of claim 8, wherein the instructions, when executed, cause the processor to:
   configure a signal transfer rate for the plurality of sensor signals; and
   combine the plurality of sensor signals into the composite pattern.

10. The at least one non-transitory computer readable storage medium of claim 8, wherein the instructions, when executed, cause the processor to:
    group a plurality of composite patterns into a set of composite patterns, wherein each composite pattern is to include the plurality of filtered sensor signals; and
    associate a predetermined finger and/or hand position with the set of composite patterns.

11. The at least one non-transitory computer readable storage medium of claim 8, wherein the instructions, when executed, cause the processor to:
    compare the composite pattern with each composite pattern of a set of composite patterns; and
    assign a weight value to each composite pattern indicating a degree of match, wherein the finger and/or and position is to be determined based on the weight value.

12. The at least one non-transitory computer readable storage medium of claim 8, wherein the instructions, when executed, cause the processor to:
    make an evaluation of a sequence position of the plurality of filtered sensor signals of the composite pattern in a set of composite patterns; and
    select a set of composite patterns based on the evaluation to be compared with the composite pattern.

13. The at least one non-transitory computer readable storage medium of claim 8, wherein the instructions, when executed, cause the processor to:
    determine a location of each sensor on the wrist of the user; and
    modify a sequence position of the plurality of filtered sensor signals of the composite pattern based on the location.

14. The at least one non-transitory computer readable storage medium of claim 8, wherein the instructions, when executed, cause the processor to determine an average value for a predetermined number of sensor signals over a filter time window for each sensor to generate the plurality of filtered sensor signals.

15. A method comprising:
generating a plurality of filtered sensor signals from a plurality of sensor signals that are generated by a plurality of sensors on a wrist of a user, wherein each filtered sensor signal includes a modified signal component that has a smoothed amplitude;
sorting each filtered sensor signal in a composite data package, and in a composite pattern based on each modified signal component, wherein a sequence position of each filtered sensor signal of the composite data package is to be based on the smoothed amplitude; and
determining finger and/or hand position based on the composite pattern, wherein control function data is generated for a function of a computing platform based on the finger and/or hand position.

16. The method of claim 15, further including:
grouping a plurality of composite patterns into a set of composite patterns, wherein each composite pattern includes the plurality of filtered sensor signals; and
associating a predetermined finger and/or hand position with the set of composite patterns.

17. The method of claim 15, further including:
comparing the composite pattern with each composite pattern of a set of composite patterns; and
assigning a weight value to each composite pattern indicating a degree of match, wherein the finger and/or hand position is determined based on the weight value.

18. The method of claim 15, further including:
making an evaluation of a sequence position of the plurality of filtered sensor signals of the composite pattern in a set of composite patterns; and
selecting a set of composite patterns based on the evaluation to be compared with the composite pattern.

19. The method of claim 15, further including:
determining a location of each sensor on the wrist of the user; and
modifying a sequence position of the plurality of filtered sensor signals of the composite pattern based on the location.

* * * * *